(No Model.)

J. ROGERS.
LENS FOR SIGNAL LAMPS AND LANTERNS.

No. 282,376. Patented July 31, 1883.

Witnesses.
Edw. H. C. Downs
F. W. Howard

Inventor.
Joseph Rogers. by
C. S. Whitman atty

UNITED STATES PATENT OFFICE.

JOSEPH ROGERS, OF HANOVER SQUARE, COUNTY OF MIDDLESEX, ENGLAND.

LENS FOR SIGNAL LAMPS AND LANTERNS.

SPECIFICATION forming part of Letters Patent No. 282,376, dated July 31, 1883.

Application filed March 21, 1883. (No model.) Patented in England February 19, 1883, No. 908.

*To all whom it may concern:*

Be it known that I, JOSEPH ROGERS, a citizen of England, residing at Hanover Square, in the county of Middlesex, England, have invented an Improvement in Lenses for Signal Lamps and Lanterns, (for which I have obtained provisional protection in Great Britain, dated February 19, 1883, No. 908,) of which the following is a specification.

For signal lamps or lanterns that are required to transmit colored light—such as are used on railways, ships, and for other purposes—it has been customary to construct the lenses of glass of the color required, and such color, more particularly the green, has the detrimental effect of greatly reducing the light transmitted through the lens. Now, according to my present invention, I obviate this defect by employing, in place of the lens of colored glass, a lens of white glass, formed in two parts, so as to constitute a compound lens, and I introduce between the two parts or lenses a disk or sheet of glass of the required color, or I form on one or both the contiguous surfaces of the two lenses a layer or coating of colored glass, the three parts thus combined being secured together, and forming a compound lens that will transmit light of the desired color nearly as effectively as a lens of white glass will transmit white light. In some cases the two lenses may be fixed together with a narrow space between them, into which a loose disk of colored glass is inserted.

The lenses employed for the purpose of my invention may be of any known form that will transmit light to a distance and they may be either dioptric or prismatic. In the accompanying drawings I have shown various forms of such lenses.

Figure 1:
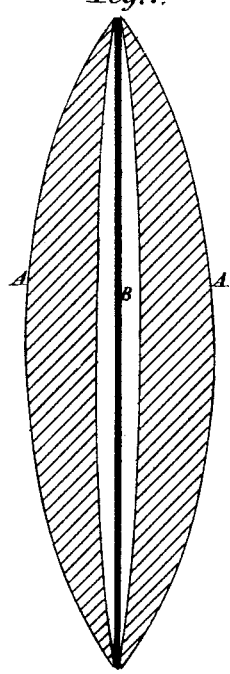
Figure 2:
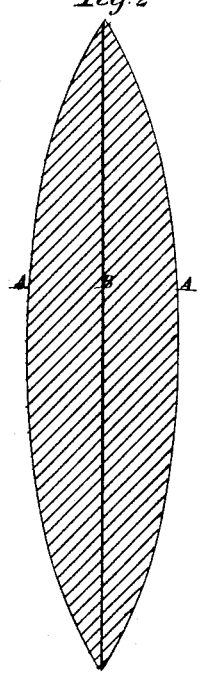
Figure 3:
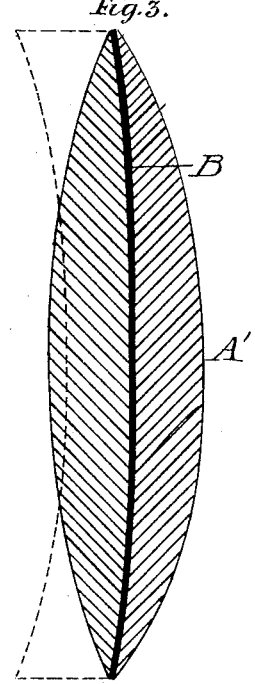
Figure 4:
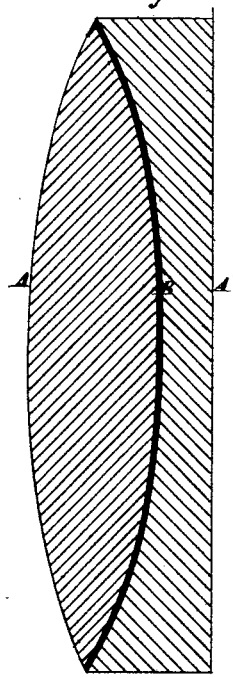
Figure 5:
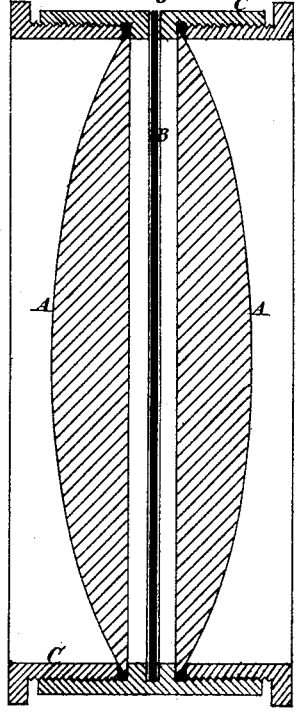

Figure 1 shows a section of a double-convex lens composed of two meniscus (or they may be plano-convex) lenses, A A, with a flat disk of colored glass, B B, between them. Fig. 2 shows a combination of two plano-convex lenses, A A, one or both of whose plane surfaces are coated or "flashed" with glass of the required color. Fig. 3 shows the combination of a double-convex lens with a meniscus lens, A', and a disk of colored glass, B, between them, having a curvature corresponding to that of the contiguous surfaces of the two lenses; or the lens A may be concavo-convex, as indicated by dotted lines at $A^2$, instead of double convex. Fig. 4 shows a double-convex lens, A, combined with a plano-concave lens, A', and a corresponding curved disk of colored glass, B. Fig. 5 shows two plano-convex lenses, A A, fixed together in a frame, C, with a narrow space between them, into which is loosely inserted a disk of colored glass, B.

Having thus described the nature of my invention and the best means I know of carrying it into practical effect, I wish it to be understood that I am aware that signaling-lamps are commonly used on railways having an ordinary white-glass lens, in front of or behind which disks of stained or colored glass are raised and lowered for signaling purposes; that an interposed film of tinted balsam has been heretofore used, and that it is old to flash one side of a white-glass single lens.

I therefore claim—

A compound lens for transmitting colored light in signal lamps and lanterns, consisting of the combination of two lenses or two parts of a lens with a sheet or layer of colored glass between them.

In testimony whereof I have signed my name to this specification, in the presence of two subscribing witnesses, this 8th day of March, A. D. 1883.

JOSEPH ROGERS.

Witnesses:
 FREDK. TAYLOR,
  3 *Greenleaf Lane, Walthamstow.*
 JOHN DEAN,
  17 *Gracechurch Street, London, E. C.*